Dec. 25, 1962     R. C. BREINER     3,070,480
CORRUGATED PANEL AND METHOD
Filed Oct. 22, 1959

INVENTOR.
RICHARD C. BREINER
BY
ATTORNEY

United States Patent Office 3,070,480
Patented Dec. 25, 1962

3,070,480
CORRUGATED PANEL AND METHOD
Richard C. Breiner, Somerville, N.J., assignor to Johns-Manville Corporation, New York, N.Y., a corporation of New York
Filed Oct. 22, 1959, Ser. No. 847,969
13 Claims. (Cl. 156—207)

This invention relates to building panels, and the like; more specifically, it relates to building panels of the honeycomb-type and to a novel method for joining a basic conventional honeycomb construction to superimposed layers of material used in forming composite building panels according to the present invention. In addition, the invention concerns itself with a novel honeycomb core which may be used in various ways with or without finishing or strengthening material added thereto.

It is conventional in the art of manufacturing building panels to provide a reticulated core conforming to what is known as a "honeycomb," wherein a plurality of undulated sheets of material, commonly referred to as ribbons, are joined to each other along their faces, as, for example, by adhesive cement. Such a honeycomb core has subsequently applied thereto a pair of planar sheets at the reticulated edges of the honeycomb to form a "sandwich type" of construction. A common expedient of adhering the "skins" or the sheets sandwiching the honeycomb core is to apply adhesive at the honeycomb edges, lying in the planes normal to the cell longitudinal axes, which adhesive, when set or cured, bonds the core to the sheets.

One of the disadvantages of such a panel construction lies in the fact that a limited glue contact area is provided between the reticulated edges of the core construction and the underlying and overlying sheets, since the glue contact area is determined primarily by the thickness of the undulated sheets at the edges of the honeycomb core. As a result, in tests for determining shear characteristics of such conventional honeycomb panels, failures occur primarily at the glue lines between the overlying and underlying sheets and the core rather than in the core itself. In addition, since such a construction provides a plurality of enclosed cells or compartments, it is very difficult to remove the excess moisture or to evaporate solvent which may be used in conjunction with the adhesive.

An object of this invention, therefore, is to provide a novel honeycomb-type of panel and a novel honeycomb core, wherein a mechanical interlock is provided for the basic core of the panel and the underlying and overlying sheets attached thereto.

An additional object of this invention is to provide a novel honey-comb type of panel and a novel honeycomb core, wherein the adhesive contact area between the core and the underlying and overlying sheets is appreciably increased providing thereby a stronger adhesive bond between the basic core and the sheets.

Still a further object of this invention is to provide a novel honeycomb-type of panel and a novel honeycomb core which exhibit greater strength characteristics in shear and in tension, than honeycomb-type panels and cores known heretofore.

A further object of this invention is to provide a novel method of forming a honeycomb-type of core and also a novel composite panel construction utilizing the novel honeycomb core of this invention.

In brief, the invention comprises a honeycomb-type of panel having its core formed by joining a plurality of undulated sheets or ribbons to each other along portions of their faces to form thereby the basic honeycomb construction. The core has superimposed on both sides thereof, i.e., adjacent the co-planar reticulated edges lying in planes transverse to the longitudinal axes of the cells, undulated sheets of material pressed into the honeycomb core such that the edges of the core material slice through or sever the undulations, peaks, or nodes of the underlying and overlying undulated sheets. Adhesive is appropriately applied to the basic panel construction so that an adhesive bond is obtained between the reticulated edges of the basic honeycomb construction and the underlying and overlying undulated sheets, which includes an adhesive bond at the additional lines of contact therebetween. If desired, additional sheets of material may be adhered to the superimposed undulated sheets to provide decorative surfaces for the honeycomb construction; the additional superimposed sheets may also be of such a nature as to provide greater rigidity to the basic core.

These and other objects will be readily apparent from the preceding brief description and the following more detailed description and the attached drawings, wherein.

Figure 1:
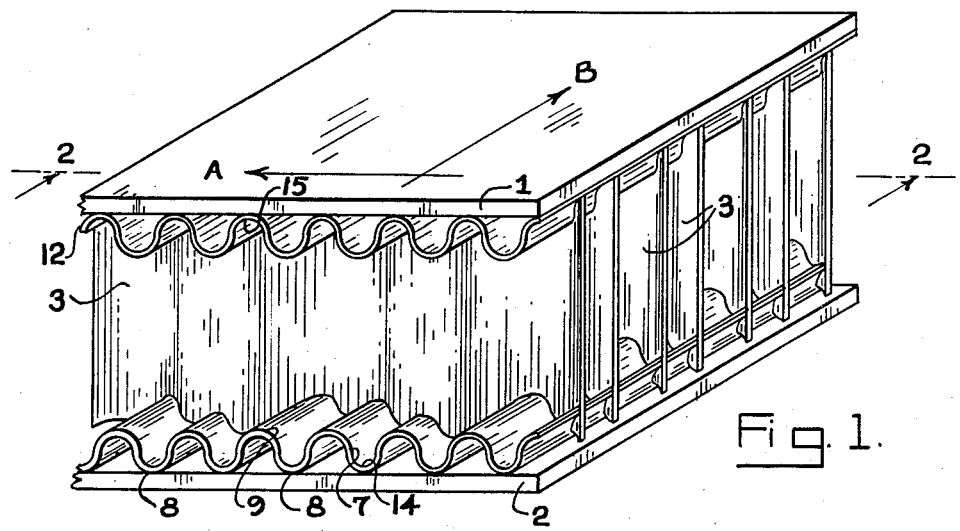
FIG. 1 is a perspective view of the novel honeycomb-type of panel of this invention.

Referring to the figures of the drawing, a pair of planar sheets 1 and 2, comprising the "skins" of the honeycomb panel, have adhered to their inner faces undulated sheets 12, 7 respectively. Each undulated sheet is secured to its adjacent planar sheet by adhesive applied to the portions of each undulated sheet face in contact with its adjacent planar sheet. Thus, for example, the lower undulated sheet 7 is in contact with its adjacent planar sheet or "skin" 2 along the areas or lines of contact 8; prior to assembly, adhesive is applied to these areas of contact 8, usually to the undulated sheet, so that upon assembly an adhesive bond is obtained between the undulated sheet 7 and the adjacent sheet 2, for example, along such areas of contact.

Figure 3:
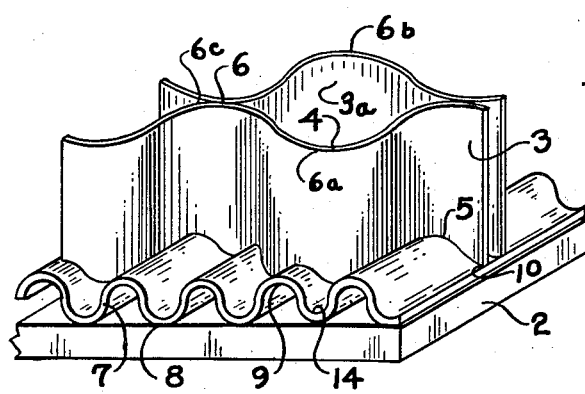
FIG. 3 is a perspective view of a portion of the honeycomb panel showing in greater detail the jointure of the core to an underlying undulated sheet and the jointure of the underlying sheets to each other.

The honeycomb core is fabricated by joining a plurality of undulated ribbons 3 to each other in any convenient manner, as, for example, by adhesively joining the portions of the major faces of the ribbons 3 in contact with each other. Referring in particular to FIG. 3, adhesive is applied to the portions of the undulations adjoining the peaks, nodes, or crests, 6, 6a, 6b, 6c, et cetera; when the ribbons are subsequently mated, the adhesive cures and a basic honeycomb construction of the type shown in FIG. 1 is formed. The ribbons 3 are preferably of the same height and are accurately joined so that the upper edges 4 are co-planar. In considering a core of the honeycomb type, the direction denoted by line A (FIG. 1) is considered as the ribbon direction and that of line B as the across the ribbon direction.

The ends or edges 4 and 10 (FIG. 3), per se, form a reticulated pattern, as contrasted with the other edges or faces on the other sides of the core. Consequently, for the purposes of this disclosure, the terms "reticulated edges" or "reticulated ends" denote the edges or ends 4 and/or 10, without restricting in any way the particular configurations of the ends or edges at any of the remaining sides of the core.

When a basic honeycomb core of the desired proper size and shape has been formed as disclosed, it may be dipped slightly into a solution of adhesive so that only the edges or ends 4 and 10 are covered with adhesive; the adhesive can be applied, for example, by having the edges 4 and 10, in turn, merely touch the surface of the adhesive solution. The core is then placed between and properly aligned with the "skins" 1 and 2, or more precisely between the undulated sheets 12 and 7, previously joined to the "skins" 1 and 2. Pressure is applied to the outer major faces of the outer sheets 1 and 2; subjected to this compressive force, the reticulated core slices through or pierces the nodes, crests, or peaks 9 of the underlying sheet 7 and the nodes or peaks 13 of the overlying sheet 12. Since the edges of the reticulated core may or may not be sharp, at times some crushing of the nodes or peaks 13 may occur. This slicing or piercing effect is continued through the peaks 13 and 9 of the undulated sheets 12 and 7 until the edges 4 and 10 approach the valleys or depressions 15, 14 of the overlying and underlying sheets. Further piercing is difficult to obtain in view of the backing provided for the undulated sheets 7 and 12 and also in view of the decreased piercing angle between the surfaces 4 and 10 and the surfaces adjacent the valleys or depressions 14 and 15. Consequently, after the edges 4 and 10 come into contact with the innermost surfaces 15, 14 of sheets 12 and 7, the pressure is relieved and no additional or further piercing action is attempted to be obtained.

As noted in FIG. 3, for example, the honeycomb core is adhesively attached to the lower undulated sheet 7 by having its lower reticulated edges 10 in contact by an adhesive bond with the underlying sheet 7 at the valleys 14. Moreover, an additional line of contact 5 and an additional adhesive bond is produced at the contacting portions between sheet 7, adjacent the major faces thereof, and each ribbon 3, where each such ribbon has sliced through or pierced the nodes or crests 9 of the sheet 7. During the piercing or severing action, sufficient adhesive is scraped off from the ends 10, so that the lines or areas of contact 5 are well supplied with adhesive to form a strong bond between sheet 7 and each sheet 3 at the additional lines of contact. In the event, for example, that insufficient adhesive is imparted adjacent the lines of contact 5, this may be corrected in subsequent panel constructions by dipping the honeycomb core slightly deeper into the adhesive solution, so that the portions of the face areas adjacent the edges 4 and 10 are also covered with adhesive. With this manner of adhesive application, additional adhesive is scraped up from the sides or faces of ribbons 3 during the severing or piercing action to enclose completely the added lines of contact 5 between sheets 7 and ribbons 3. It is understood, of course, that a similar severing action is obtained between the ribbons and the overlying undulated sheet 12, as described with reference to the action and effect produced between the ribbons and the undulated sheet 7.

Figure 2:
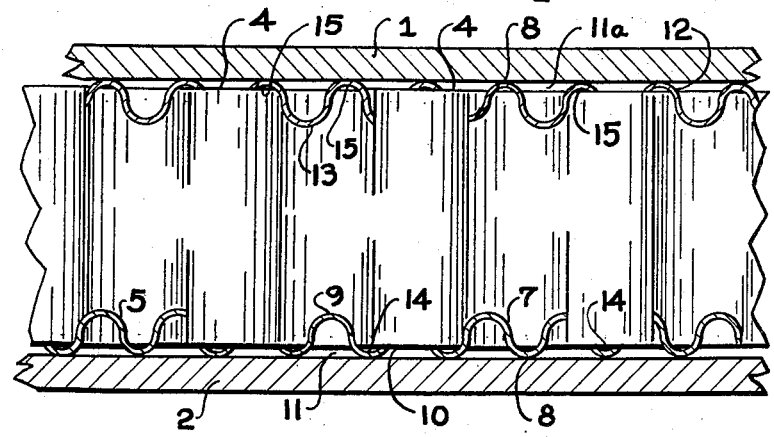
FIG. 2 is a partial cross-sectional view of the honeycomb-type of panel of FIG. 1 taken along section lines 2—2 of FIG. 1.

Referring to FIG. 2, it is seen that narrow gaps 11 are created, bordered by panel 2, edges 10 and the unpierced portions of sheet 7. These gaps or spacings 11 allow moisture or solvent, possibly used with the adhesive, to evaporate from the composite panel during and after setting or curing of the adhesive. While each gap 11 has been shown to extend from one side of an undulation in sheet 7 to an opposite side thereof, in actual practice, however, such spacing is not so precisely produced. Globules of adhesive still remain adjacent edges 10 and, in addition, portions of the severed areas of sheet 7 are dragged down to block the gap. However, a sufficient clearance is provided whereby evaporation of moisture or solvent is materially increased. Gaps 11a, similar to gaps 11, are formed adjacent the uppermost areas of the composite panel and fuction in the same manner as gaps 11.

The construction has been disclosed with reference to a pair of "skins" 1 and 2 on either side of the basic honeycomb core; however, it is evident that the "skins" may be omitted from each side or from only one side and the invention then comprises a basic honeycomb core strengthened by the undulated sheets 7 and 12 as described herein. Consequently, the sheet 7, for example, would not be adhesively bound to its adjacent sheet 2 along the lines of contact 8 during manufacture but would be merely superimposed thereover. In such a mode of construction, sheets 1 and 2 merely provide a temporary backing during manufacture of the basic honeycomb core, strengthened as described. After forming of the strengthened core, sheet 1 or sheet 2 or both are removed from the core in any convenient manner.

The novel type of panel, as disclosed herein, exhibits characteristics not found in honeycomb panels, fabricated heretofore. Thus, for example, the adhesive contact provided gives approximately 50% more glue contact area and also different gluing contact characteristics than in standard honeycomb constructions, wherein the sole adhesive contact is between edges 4 and 10 of a basic honeycomb core and the underlying and overlying sheets 1, 2. Thus, the areas of adhesion at the lower side of the panel of FIG. 2, for example, are between edges 10 and depressions 14, areas of ribbons 3 in contact with peaks 9, and portions of the faces of sheet 7 in contact with sheet 2. Similar adhesion areas are found at the upper side of the composite panel, also. Moreover, a mechanical type of interlock is provided between the undulated sheets 7 and 12 and the ribbons 3. This interlock is provided, on the lowermost side, for example, by the raised portions 9 firmly enclosing between themselves areas of ribbons 3 of the core along the lines of contact 5. Thus, even without the adhesive bond between sheets 7 and 12 and the core ribbons, movement in the ribbon direction and across the ribbon direction is resisted to a great extent by the mechanical interlock depending upon the strength of the basic sheet 7.

In view of the greater adhesive contact areas provided by the present invention, a panel constructed according to the precepts of this invention exhibits greater tensile strength contrasted with the tensile strengths of honeycomb-type panels made heretofore. As noted, approximately 50% greater adhesive area is provided. Furthermore, the adhesive areas at the lines of contact 5 in tensile strength tests exhibit a shearing action or shearing effect rather than a pure tensile effect as is found between edges 4 and 10 and the adjoining planar sheets in a conventional panel. Also, the primary adhesive contact between the novel core and the sheets 1 and 2 is between the faces of sheets 12 and 7 in contact with sheets 1 and 2 rather than between edges 4 and 10 in contact with sheets 1 and 2, as found in conventional honeycomb panels prior to this invention.

In forming the panel construction of the present invention, a five pound asbestos paper (i.e. 5 lbs./100 sq. ft.) was utilized for the ribbons 3 and also for the undulated sheets 7 and 12. The paper selected contained 2–5% elastomeric size and was saturated with a 25% water solution of aluminum phosphate wherein the phosphoric acid was in a ratio to the hydrated alumina of 3:1.5; the aluminum phosphate acts as a stiffening agent to the paper. While in the wet condition, the sheets were corrugated or undulated. Ribbons 3 were corrugated so that the undulations produced were quite large, consistent with good honeycomb practice; this is necessary in order to reduce the weight of the honeycomb core, as light weight is, of course, one of the distinguishing characteristics of any form of composite honeycomb-type panel. The sheets 7 and 12, on the other hand, were corrugated or undulated so that the undulations were appreciably smaller than the undulations of ribbons 3. In the particular constructions utilized, the diameter of the undulations of sheet 7 contrasted to the diameter of the undulations of ribbons 3 were in a ratio of approximately 1:3. Upon drying, the sheets and ribbons were quite stiff, especially when contrasted with their prior state, and relatively brittle to the touch. The ribbons 3 had adhesive applied thereto at the portions of the faces adjoining the crests and valleys 6, 6a, etc., and were juxtapositioned and joined to each other to form the basic honeycomb core.

The sheets 7 and 12 had adhesive applied thereto at the areas of contact 8 and 15 and were joined along the adhesive lines to backing sheets 1 and 2 of the asbestos-cement type. The basic honeycomb core was dipped in adhesive so that its reticulated edges 4 and 10 were properly covered with adhesive. The core was then placed between the corrugated sheets 7 and 12 and pressure was applied to the outer faces of the sheets 1 and 2 by a small press. The sharp, relatively rigid edges of the treated honeycomb severed the nodes, crests, or peaks 9 and 13 of the transverse brittle sheets 7 and 12, producing the composite panel of the present invention upon setting of the adhesive.

It is evident that numerous substitutions are possible within the purview of this invention. While the specific embodiment of the honeycomb was formed from asbestos paper, other types of papers and materials, as, for example, treated corrugated paper, metal foil, and the like, may be utilized either for the ribbons 3 or the sheets 7 and 12. The sheets 7 and 12, however, must be embrittled to a certain extent depending upon the type of material used. The embrittling should provide a sheet 7, for example, which can be severed quite readily by the edges 10 of the basic core, but at the same time it must not be so readily crushable that a crushing action by the edges 10 is produced rather than a sharp severing action. If such a crushing is effected, the added adhesive bond relied upon results primarily by the accumulation of surplus adhesive between the ribbons 3 and the undulations 9 of sheet 7. On the other hand, sheets 7 should not be embrittled to such an extent that they are considerably stronger than ribbons 3 or the edges 4 and 10 of ribbons 3, so that upon pressure mating of the basic core to the sheet 7, for example, the edges 10, rather than sheet 7, are crushed or dented to an appreciable degree. In such an action, only a single line of contact between ribbons 3 and sheet 7, for example, would be effected, which would be along line 5, indicated in FIG. 3. In addition, depending upon the types of materials used for the ribbons 3 and sheets 7 and 12, the particular additives, if any, may vary. For example, the ribbons 3 and sheet 7 may comprise ordinary paper impregnated with phenolic resins, or the like, to impart the necessary strength and rigidity thereto. It is evident also that the ribbons 3 may be materially different than the sheets 7 and 12 and treated in a way different from the manner of treatment of sheets 7 and 12.

In the specific embodiment described herein, the planar, facing sheets 1, 2 were of the asbestos-cement type, approximately ⅛" thick. Sheets of this nature appreciably increase the strength of the composite panel. It is evident, however, that numerous substitutions may be made for the asbestos-cement sheets; for example, sheets of plywood, metal, wood, fibreboard, or the like, likewise may be used. While the specific embodiment discloses the planar sheets as being on both sides of the novel honeycomb core, it is understood that, in some installations, a finished sheet may be utilized only on one side where the esthetic effect of the opposite side is not significant. Likewise, where the strength and rigidity requirements are not very stringent, the relatively rigid facing material recited may be substituted by flexible sheets having very little strength or strength imparting characteristics. For example, the finishing material may comprise various kinds of decorative paper and cardboard, plastic sheets, resinous sheets, metal foil, and the like.

In the embodiment described herein and also in the preceding general description of the invention, the illustrative method of applying the adhesive was by lowering the core into a solution of the adhesive to wet the edges of the core. It is understood, of course, that other application systems may be utilized to apply the adhesive; for example, the core edges 4, 10 may be sprayed or brushed with adhesive. Consequently, these or any other of the well known expedients used to apply adhesive may be used in lieu of the dipping or immersing system described herein and still remain within the scope and intent of this invention.

In the same vein, it is evident that other fastening or securing systems may be utilized to fixedly mate sheets 12 and 7 to the outer sheets 1 and 2. The adhesive system described may be substituted, for example, by stitching, staples, or other forms of mechanical fasteners. It would not be outside the scope and intent of this invention, for example, to fabricate the sheets 7 and 2 or the sheets 12 and 1 as a sub-assembly from continuous strips of material, which subsequently can be cut to the proper length and width depending on the size of the composite panel desired to be made, with the honeycomb core later embedded in such subassemblies.

The specific embodiment of the invention disclosed and illustrated herein utilizes corrugated ribbons having the corrugations in the geometrical pattern of a sine wave for the basic honeycomb core and sheets of similar form for the underlying and/or overlying undulated sheets. It is to be understood that the corrugated construction may take other forms and still remain within the purview of this invention. Technically speaking, for example, "honeycomb" from an apiary sense is a mass of hexagonal cells; however, in the building field, "honeycomb" has been extended to signify any type of construction resembling, but not necessarily exactly alike, an apiary honeycomb. Consequently, the core may have its sheets of almost any polygonal or curved form arranged in a reticulated pattern. Similarly, the undulations in sheets 7, 12 need not be precisely curved, but may be of regular or irregular form in a wide variety of cross-sectional configurations.

The honeycomb core has been shown to have the ribbons, 3, FIG. 3 for example, running transverse to the corrugations of the underlying sheet 7. The ribbons 3 may be located with respect to the corrugations of sheet 7 so as to run parallel therewith. The results noted heretofore likewise result with this modified construction.

While the invention has been described in rather full detail, it will be understood that these details need not be strictly adhered to and that various changes and modifications may suggest themselves to one skilled in the art, all falling within the scope of the invention as defined by the subjoined claims.

What I claim is:

1. A method of forming a panel utilizing a honeycomb core comprising placing a sheet having a plurality of undulations therein adjacent the honeycomb core so that the reticulated edges on one side of the core are generally parallel to the axes of said undulations, and embedding the contacting edges of the core into the undulations of the sheet so that the areas of the core adjacent said reticulated edges become interlocked therewith.

2. A method of forming a panel comprising joining a plurality of corrugated ribbons in a manner to form a basic honeycomb core, placing a corrugated sheet adjacent the honeycomb core so that the reticulated edges on one side of the core and generally parallel to the axes of the corrugations of said sheet, and embedding the reticulated edges on one side of the core into the corrugated sheet thereby having the reticulated edges of the core encompassed by the facing nodes of the corrugated sheet.

3. A method of forming a panel comprising joining a plurality of undulated ribbons at their faces to form a basic honeycomb core, mating the reticulated edges of the formed core with undulated sheets so that the axes of the undulations of said sheets are generally perpendicular to said ribbon faces, pressing the undulated sheets into the reticulated edges of the core thereby having said edges pierce through the undulations of the undulated sheets, and applying adhesive to the panel construction so that the undulated ribbons of the core adhere to the sheets along the lines of contact therewith.

4. A method of forming a panel comprising joining a plurality of undulated ribbons along the undulations thereof to form a honeycomb core, mating embrittled undulated sheets to planar panels, mating the reticulated edges of the core with the embrittled undulated sheets, the reticulated edges, the axes of the undulations of said sheet, and the planar panel being generally parallel, pressing the panels and embrittled undulated sheets toward each other to force the edges of the core through the undulations of the embrittled sheets, and adhesively securing the panels to the core so that the core is bonded to the pierced embrittled sheets along the lines of contact therewith.

5. A method of forming a panel comprising joining a plurality of undulated ribbons at their faces to form a reticulated construction, placing an undulated sheet adjacent the reticulated construction so that the axes of the undulations of said sheet are generally perpendicular to faces of the undulated ribbons, forcing the reticulated edges of the joined undulated ribbons into the undulated sheet thereby having said edges pierce through the undulations of said sheet, and adhering the joined undulated ribbons to the pierced undulated sheet along the lines of juncture therebetween.

6. A method of forming a honeycomb construction from paper, comprising, forming a plurality of undulations in sheets of paper, embrittling the sheets of paper, joining the undulated sheets to form a honeycomb core, facing the reticulated edges of the formed core with embrittled undulated sheets, the axes of the undulations of said undulated sheets being generally parallel to the reticulated edges of the honeycomb core, and pressing the reticulated edges of the core into the undulations of the facing sheets.

7. The method of forming a honeycomb construction as recited in claim 6, further including applying adhesive to the honeycomb construction so as to have adhesive at the areas of contact between the facing sheets and the core.

8. A method of forming a panel utilizing a reticulated honeycomb core of embrittled asbestos paper, comprising placing an embrittled asbestos paper sheet having a plurality of undulations therein adjacent the core so that the reticulated edges on one side of the core are generally parallel to the axes of the undulations of the sheet, and embedding the contacting edges of the core into the sheet so that the areas of the core adjacent said reticulated edges become interlocked therewith.

9. A honeycomb construction comprising a plurality of corrugated ribbons joined together to form a honeycomb core, and a corrugated sheet adjacent the reticulated edges on one side of the honeycomb core, the axes of the corrugations of the corrugated sheet being generally parallel to said reticulated edges, said sheet being pierced appreciably through the facing node portions of the corrugations by said edges.

10. A panel construction comprising a pair of spaced, facing panels in sheet form, an undulated sheet joined to each of the inner faces of the opposing panels, and a honeycomb core construction separating the facing panels and joined to the undulated sheets by having the undulations of the undulated sheets pierced by the reticulated edges on each side of the core, the axes of the undulations of said sheets, the reticulated edges, and the facing panels being generally parallel.

11. A panel construction comprising a plurality of undulated ribbons joined to each other at their faces to form a reticulated core, an undulated sheet, the axes of the undulations of said sheet being transverse to the faces of the joined undulated ribbons forming the reticulated core, the undulated sheet being pierced by the reticulated edges of the undulated ribbons, and means to adhere the faces of the joined undulated ribbons to the undulated sheet along the lines of juncture therebetween.

12. A panel construction comprising a honeycomb core, undulated sheets adjacent the reticulated edges of the core, said reticulated edges being generally parallel to the axes of the undulations of said sheets and being embedded in the undulations of the sheets, and covering material adhering to at least one of the exterior faces of the undulated sheets, and means to bond the core to the undulated sheets adjacent the areas of contact therebetween.

13. A honeycomb construction utilizing a plurality of corrugated, embrittled asbestos paper ribbons joined together to form a honeycomb core, a corrugated, embrittled asbestos paper sheet, the axes of the corrugations of said sheet being generally parallel to the reticulated edges on one side of the honeycomb core, said sheet being pierced appreciably through the facing node portions of the corrugations by said reticulated edges.

References Cited in the file of this patent

UNITED STATES PATENTS

| | | |
|---|---|---|
| 2,477,852 | Bacon | Aug. 2, 1949 |
| 2,556,470 | Del Mar | June 12, 1951 |
| 2,860,740 | Holland et al. | Nov. 18, 1958 |
| 2,986,379 | Kramig | May 30, 1961 |